UNITED STATES PATENT OFFICE.

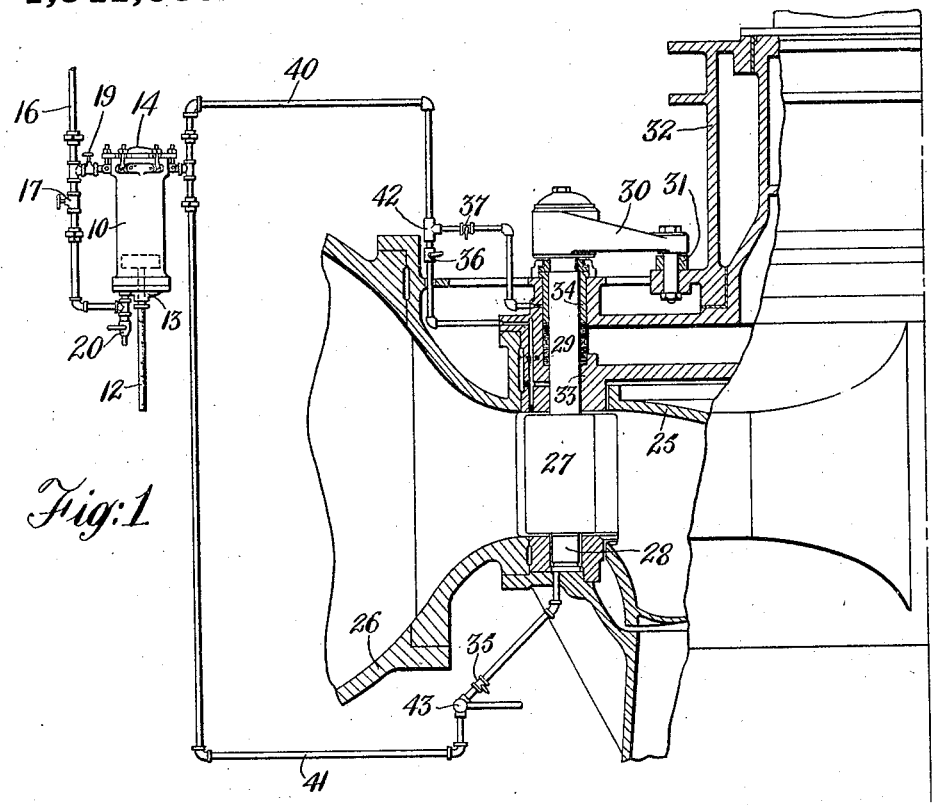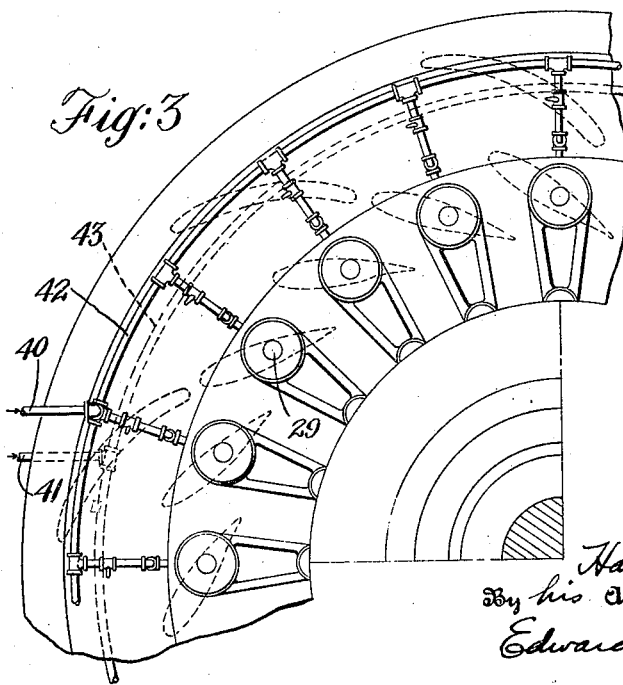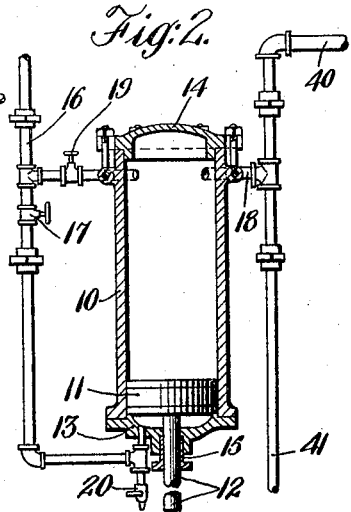

HARVEY BIRCHARD TAYLOR, OF PHILADELPHIA, PENNSYLVANIA.

SYSTEM OF LUBRICATION.

1,341,866.   Specification of Letters Patent.   Patented June 1, 1920.

Application filed March 10, 1919. Serial No. 281,751.

*To all whom it may concern:*

Be it known that I, HARVEY BIRCHARD TAYLOR, a citizen of the United States, residing at Philadelphia, in the county of Philadelphia and State of Pennsylvania, have invented certain new and useful Improvements in Systems of Lubrication, of which the following is a specification.

The principal object of my invention is to provide new and improved apparatus and a method for lubricating bearings conveniently and effectively. Another object of my invention relates to lubrication by a central forced feed of the lubricant with manually controlled distribution thereof to various bearings. These and other objects of my invention will be readily appreciated from the disclosure contained in this specification and the accompanying drawings of one example of apparatus and method according to the invention. It will be understood that modifications may be made within the scope of the invention.

In the drawings, Figure 1 is a general elevation, partly in section, showing a hydraulic turbine equipped in accordance with my invention.

Fig. 2 is an enlarged sectional view of a grease gun which appears on a smaller scale in Fig. 1, and Fig. 3 is a plan view of the turbine and equipment which are shown in elevation in Fig. 1.

The grease gun shown in Fig. 2 and also at the left of Fig. 1 consists of a metal cylinder 10 in which moves the piston 11, connected to a guide rod 12. The two ends of the cylinder are closed by heads 13 and 14. Head 14 is arranged to be quickly and conveniently removed, and is secured in place by hinged bolts or other suitable means. Head 13 contains stuffing box 15 for the guide rod 12. The portion of the cylinder above the piston is filled with grease or other lubricant by removing the head 14. Air pressure or other fluid pressure (the particular arrangement shown being more especially adapted for air pressure) is admitted through supply pipe 16 and valve 17 to the lower end of the cylinder, thus forcing piston 11 up and driving the grease out through pipe 18 which is connected by suitable piping and fittings to the bearing or bearings to be lubricated. The tail rod 12 serves as a guide for the piston 11 and as an indicator to show the location of the piston 11 and the quantity of grease in the cylinder 10. The guide rod may be graduated to indicate the amount of grease admitted to each bearing. When all of the grease in the gun has been exhausted and it is desired to refill the cylinder, valve 17 is closed and valve 19 opened, thus admitting air pressure to the top of the cylinder and driving piston 11 down to its lowest position. Head 14 may then be removed and the cylinder re-filled with grease. During this operation drain valve 20 is opened to permit exhausting the air below piston 11.

Fig. 1 shows the sectional elevation of a portion of a hydraulic turbine in which 25 is the turbine runner, 26 the turbine casing, and 27 one of the guide vanes which controls the flow of water from the casing to the runner. There are usually from 16 to 24 of these guide vanes equally spaced around the periphery of the runner. Each guide vane has cast with it or secured to it a lower shank 28 and an upper shank 29. The upper shank is connected through a lever 30 and a link and pin connection 31 to an operating ring 32, so that all of the guide vanes are simultaneously moved by the movement of the operating ring.

Properly to hold each guide vane in position, three bearings are provided for the shanks as shown at 28, 33, and 34. In order properly to lubricate each of the three guide bearings of each of the guide vanes, these bearings are connected by suitable piping, valves, and fittings to the top chamber of the grease gun. In order to insure the proper lubrication of each individual bearing, it is necessary that each of these bearings be lubricated independently of all the remaining bearings. In Fig. 1, the necessary piping connections and valves are shown between the grease gun and the three bearings of one of the guide vanes. It will be noted that each of the three bearings 28, 33, and 34 is separately controlled respectively by one of the valves 35, 36 and 37. The operation of lubricating each of these bearings is as follows:

All valves on the system being closed, the air pressure is admitted by opening valve 17 below the piston in the grease gun, and grease under pressure is admitted to supply pipes 40 and 41. The grease is then admitted independently to each of the three guide vane bearings by opening and closing in turn each of the three valves 35, 36 and 37.

In the case of a turbine containing say 20 guide vanes, the three bearings of each vane are connected in the same manner as shown in Fig. 1 to the supply lines 40 and 41 by means of suitable manifold pipes 42 and 43. It is thus seen that for a turbine containing 20 guide vanes it is possible independently and assuredly to lubricate each of the 60 bearings by opening and closing the separate control valves for each bearing.

Sometimes it is very difficult to lubricate the bearings or other moving parts of a machine by means of the ordinary hand-operated grease cups, due to the resistance to the flow of grease to the bearing or moving part. By my invention an adequate power pressure may be applied to insure overcoming the resistance and moving the grease as desired. In case it were attempted to feed the grease simultaneously to more than one bearing, the respective grease ducts thereto might offer different degrees of resistance and thus a very unequal distribution would be effected. My system provides a power supply with a manual control of the distribution by which the supply can be directed in succession to each bearing exclusively thus facilitating a desired distribution of the grease to the various bearings.

In the following claims I use the term "bearing" to designate a bearing or equivalent place for which lubrication is desirable.

I claim:—

1. The method of lubricating a plurality of bearings subjected to fluid pressure and having branch conduits thereto from a main grease gun, which consists in applying a pressure tending to force the grease from the gun along said conduits and then manually opening and closing the conduits singly and in succession and thereby forcing grease from the gun against said fluid pressure to the respective bearings in succession and in amounts that may be relatively variable.

2. The method of lubricating a plurality of bearings subjected to different and varying fluid pressures and having branch conduits thereto from a main grease gun, which consists in maintaining a pressure tending to force the grease from the gun along said conduits and then manually opening any particular conduit when there is occasion and thereby applying full pressure on said open conduit and forcing grease from the gun to the corresponding bearing against the fluid pressure thereat.

3. The method of lubricating the gate bearings for a hydraulic turbine from a main grease gun with conduits from said gun to said bearings which consists in admitting fluid pressure to said grease gun and thereby applying a pressure tending to force the grease from the gun along said conduits and then opening and closing the conduits singly whereby the grease will be supplied positively and definitely to the respective bearings.

4. A method of lubricating a hydraulic turbine having a plurality of bearings under variable pressure and having branch conduits thereto from a main grease gun, which consists in admitting pressure to said grease gun from an independent source of fluid pressure and thereby maintaining a pressure tending to force the grease from the gun along said conduits and then manually opening any particular conduit when there is occasion and thereby forcing grease in desired amount from the gun to the corresponding bearing.

5. A grease gun comprising a cylinder, a piston therein, grease on one side of the piston, a grease conduit leading from the same end of the cylinder, a fluid or air pressure supply conduit with branches to respective ends of the cylinder, valves in said grease conduit and said branches of the fluid or air supply conduit, and a drain valve from the end of the cylinder opposite to the grease end, whereby the fluid pressure may be applied to force the grease from the gun or to restore the piston to initial position thereafter.

6. A grease gun comprising a cylinder with a port at each end and connected by a system of conduits to a plurality of bearings, a piston in said grease gun, a piston rod passing through one cylinder head to serve as a marker and guide grease in the cylinder on one side of the piston, and means to admit pressure fluid to the cylinder on the other side of the piston to force the piston against the grease and thereby force the grease out the corresponding port.

7. In a system of lubrication the combination with a series of bearings under variable fluid pressures, of a main grease gun for supplying said bearings with lubricant, power means for applying and maintaining a pressure on the grease in said gun, connections between said gun and each of said bearings, and a valve means in each of said connections so that each bearing may be separately lubricated under the full pressure of the power means in said grease gun.

8. In combination, a plurality of bearings, a main source of pressure fluid supply, branches therefrom to said bearings, lubricant in the terminal portions of said branches, means to apply all the pressure to any individual branch singly to definitely and positively force the lubricant to the respective bearing in any desired amount, and means for indicating the amount of lubricant being supplied to each bearing.

H. BIRCHARD TAYLOR.